United States Patent [19]
Flamand et al.

[11] 3,856,131
[45] Dec. 24, 1974

[54] LOADING AND CONVEYING APPARATUS

[75] Inventors: Guy Flamand, Chalon Sur Saone; Henri Lazzarini, Saint-Denis-En-Bugey, both of France

[73] Assignee: Saint-Gobain Industries, Neuilly-sur-Seine, France

[22] Filed: Apr. 5, 1972

[21] Appl. No.: 241,188

[30] Foreign Application Priority Data
Apr. 7, 1971  France .............................. 71.12370

[52] U.S. Cl. ..................... 198/26, 198/34, 198/104, 221/277
[51] Int. Cl. .......................................... B65g 47/00
[58] Field of Search ........ 198/34, 26, 104; 141/173, 141/174; 221/265, 277

[56] References Cited
UNITED STATES PATENTS

| | | | |
|---|---|---|---|
| 2,854,125 | 9/1958 | Johnson | 198/104 |
| 3,294,286 | 12/1966 | Zibbell | 221/277 |
| 3,565,235 | 2/1971 | Brown | 198/34 |

FOREIGN PATENTS OR APPLICATIONS

| | | | |
|---|---|---|---|
| 419,964 | 3/1967 | Switzerland | 221/277 |

Primary Examiner—Richard A. Schacher
Assistant Examiner—Douglas D. Watts
Attorney, Agent, or Firm—Pennie & Edmonds

[57] ABSTRACT

Loading and conveying apparatus comprising a conveyor, means to position objects on the conveyor comprising a rotary shaft having a spiral land bounding a spiral groove, and means to load objects onto the conveyor and into the groove in sequence as successive portions of the groove reach the loading means.

8 Claims, 2 Drawing Figures

PATENTED DEC 24 1974  3,856,131
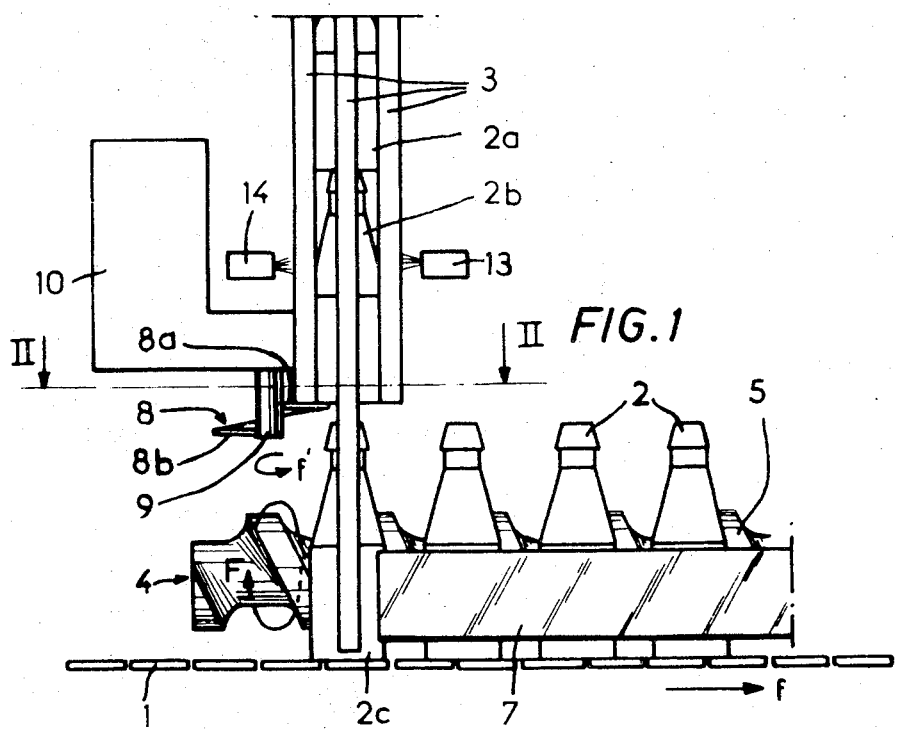
FIG. 1
FIG. 2
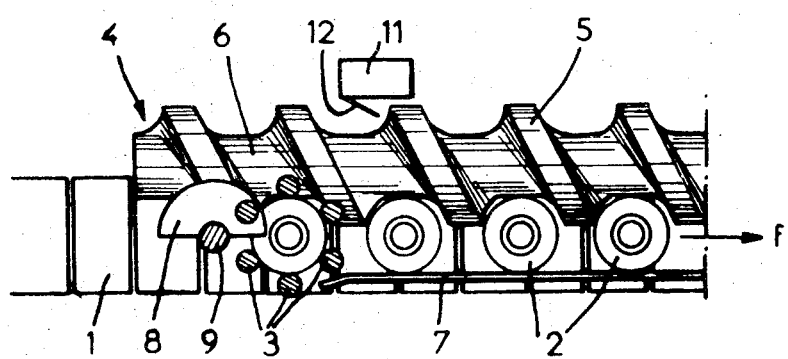

LOADING AND CONVEYING APPARATUS

This invention relates to apparatus for feeding objects onto a conveyor at regular intervals and is particularly directed to loading a conveyor with bottles, for instance plastic bottles. The feeding of conveyors as practiced heretofore was by a mechanical system involving movable retainer bars, a system having a very limited cadence of distribution.

It is an object of this invention to provide an apparatus having the capacity to load a conveyor at various chosen cadences, including cadences much higher than was satisfactory heretofore, with perfect spacing and regular movement of the loaded objects. As the invention has a primary use as a bottle loader it will be described in that use, but it is to be understood that it can handle the loading of any series of objects with no more than minimal changes in design to fit the objects being handled.

The apparatus of the invention as applied to bottles includes the combination of a horizontal conveyor to receive and transport the objects, a rotary shaft having a spiral land bounding a spiral groove and an axis parallel to the direction of movement of the conveyor and of which the groove section is deep enough to partially embrace the object transported, and a guide vertically arranged above the conveyor and a section of the spiral groove, through which the objects descend one by one into the sequence of spiral groove sections as they pass beneath the guide.

In this apparatus the spiral shaft provides regular spacing for the bottles or other objects, steadies them during transportation and filling or other work upon them, and provides exceptional regularity of progression at any speed of operation. The objects can be loaded onto the conveyor by free fall or one by one in a column in which the bottom of one rests upon the top of the one below it.

An important characteristic of the invention is a system of detection which coordinates the fall of an object with the arrival beneath the guide of a section of the spiral groove. This apparatus of detection issues a command signal which controls the apparatus which releases one object and arrests the progress of the next; thus one object is loaded on the conveyor beneath the guide in a groove section while those in the guide above it are stopped to await the arrival of another groove section. The apparatus also includes means which reveal the presence or absence of objects in the guide which remain to be loaded on the conveyor; and which will continue the loading operation only as long as there are objects in the guide to be loaded.

In a preferred and simple form of the invention the detector system includes a microswitch which has a pivoted follower which alternately rides the land adn drops into the groove sections of the rotary shaft, being disposed so that at every passage of a land a groove section will be beneath the guide and an object will be dropped into it, the microswitch emitting a signal which activates the release mechanism for the lowest object in the guide.

In its preferred form the apparatus of release includes a rotary helix of less than one turn mounted on a vertical axis, the gap in the helix being of a size to permit the passage of the bottle when aligned with the guide. This helix is located above the conveyor at a distance about equal to the height of the object being loaded. The helix supports the bottom bottle in the guide until it is rotated by a signal from the microswitch, whereupon its trailing edge 8a releases the bottom bottle through the gap in the helix and its leading edge 8b engages the bottle above it. The helix is driven by a motor, the speed of which may be varied, in the direction corresponding to the ascension of the helix.

The motor energized by the system of detection rotates the helix one full turn at each command signal. The angular dimension of the helix and the speed of rotation of the helix are chosen as a function of the height of the objects and the speed of rotation of the rotary, grooved shaft so that each object as it falls through the gap in the helix enters that section of the groove in a side of the rotary shaft which is below the guide without being struck by the leading edge of the helix.

In the preferred mode apparatus of control includes a photoelectric cell and a light beam which is directed upon it through the guide so that the passage of objects through the guide will interrupt the beam whereas, when the last object has been released, the beam activates the cell to terminate the operation. Experience has shown that unless the photoelectric cell or a similar apparatus is not provided to detect the presence of an object in a position to be released, the helix will continue to turn and an object arriving late will be damaged between the wall of the guide and the helix. This detector need not interrupt the operation of the conveyor and the rotary shaft which may continue operation until the last object of the conveyor has been serviced.

It has been established during tests that when the objects being handled are light and long, for instance plastic bottles, the bottles can be marred by the spiral land at a point beneath the axis of rotation of the shaft because, when such objects are in contact with a part of the side of the land, below its axis, there is a tendency, because of their light weight, to lean and to adopt the angle of the land. On the other hand when such objects are heavy, such as glass bottles, the position of the area of contact with the side of the land is without substantial influence on the stability of the bottle. This tendency is corrected by the invention.

The above and further objects and novel features of the preset invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is an elevational diagram of the apparatus according to the invention; and FIG. 2 is a view from above as indicated by arrows II — II.

Referring to the numerals of the drawing, which reveals the emplacement of plastic bottles on a conveyor, the numeral 1 indicates a horizontal conveyor upon which bottles 2 are transported in the direction of the arrow f toward a filling station off the drawing to the right. The bottles are guided toward the conveyor by a guide 3 having six circular rods arranged on a circle having an inner diameter approximating the outer diameter of the bottles. The bottles in the guide are supported one upon another, the bottom of bottle 2a resting upon the top of bottle 2b while in the guide. However, they could also be introduced separately in free fall.

The regular spacing of the bottles on conveyor 1 is achieved by means of a rotary shaft 4 having an axis parallel to the direction of motion of the conveyor so that, when it is rotating, the spiral land 5 progresses in the same direction as the conveyor. The speed of displacement of the land past any given point is substantially equal to that of the conveyor. As shown in FIG. 2 the longitudinal axis of the rotary shaft is at such a distance from the vertical axis of the guide that the bottles released by the guide descend in free fall into sections of the spiral groove of the rotary shaft which are of such depth as to partially embrace the bottles. During the transportation by the conveyor, the bottles are held in groove sections by a lateral guide 7.

The vertical release of the bottles is controlled by a helix 8 of less than one turn which is carried on a vertical rotary shaft 9 driven by motor 10, the speed of which may be regulated, in the direction of arrow F' which corresponds to an ascending displacement of the upper or cam surface of the helix. The helix 8 is mounted so that in the course of one complete rotation the helix initially obstructs the passage of articles through the guide then, as it turns it releases the bottom bottle through the gap in its circumference while its lower leading edge 8b, having allowed the bottom bottle to pass, interposes beneath the succeeding bottle and continues to turn until the position of release is reached. The helix 8 is so disposed that its upper trailing edge 8a is at a distance from the conveyor greater than the height of the bottle. The lower edge of the helix 8b may be at a lower level without inconvenience, even less than the height of the bottle.

The drive motor 10 is controlled by a microswitch 11 which delivers an impulse of command every time its follower 12 is lifted by the summit of the land 5. Each impulse drives the motor 10 long enough to turn the helix one complete revolution, opening and closing the guide successively. The initial angular position of the helix is chosen so that just before the reception of the operational impulse the upper edge 8a is beneath the guide and supports the bottles 2a, 2b, etc. This is the position which is illustrated in the figures. The rotation of the helix 8 is coordinated with the grooved rotary shaft, with or without a certain delay so that the bottle will be released from the guide exactly when the groove section is below the guide.

The angular amplitude of the helix is not limitative, different amplitudes being chosen for different objects, it being understood that the gap in the helix must be of sufficient size to release the lowest object without lateral contact and the dimensions of the groove in the rotary shaft must be such that the object will not be damaged as it falls by the edge of the land. In short the dimensions are so coordinated that the bottles pass freely without harmful contact with moving edges. The speed of the motor 10 may be changed when one desires to change the cadence of distribution of the machine.

The apparatus preferably includes elements to detect the presence of bottles in guide 3. In FIG. 1 this is represented as a photoelectric cell 13 and its light beam generator 14 which are disposed on opposite sides of the bottle guide so that the light beam is interrupted when a bottle rests on the helix. The rotation of the helix initiated by the signal given by the microswitch does not occur unless the photoelectric cell indicates that a bottle is present in the guide. The cell therefore prevents the rotation of the helix except when a bottle is in correct position.

The apparatus operates as follows: A cadence of delivery is chosen at which a bottle will be delivered to the first section of the groove of the rotary shaft considering the speed of rotation of the helix 8 and the interval of time which must exist between the instant when the current is turned on by the microswitch 11 and the instant of rotation of the helix. It is highly advantageous, in order that the operation shall be well coordinated, that the helix free the guide at the precise moment when a section of groove 6 is directly beneath the guide. The initial position of the helix 8 (FIG. 1) is adjusted until its upper portion, near edge 8a, partially obstructs the guide. These different coordinations having been carried out, bottles are admitted to the guide 3 either from a supply or from a bottle making machine. The bottles 2a, 2b are supported in the guide by the helix. During the rotation of the grooved rotary shaft 4 the crest of the land 5 is found immediately to the left of microswitch 11 and acts upon the follower 12. The microswitch emits an impulse of command with a certain delay which puts the helix 8 into rotation which then makes a complete revolution about its axis provided the photoelectric cell reveals the presence of a bottle in release position. At the beginning of this rotation the helix frees the bottom of the guide, drops the lowest bottle onto the conveyor, and engages those above it. The bottle 2b drops into position 2c precisely in the groove of the rotary shaft and is immediately moved toward the right by the motion of the land and conveyor.

During the time that the bottom of the guide is freed by the passage of the opened section of the helix, the bottle 2c supports the weight of the whole column of bottles so that it could not readily be moved by the rotary shaft. But the speed of rotation of the helix is such that this time is minimal in that when the helix has accomplished a rotation of 180° from its initial position its lower edge 8b engages the bottom of bottle 2a and raises it out of contact with the released bottle.

In the construction shown in the drawings the helix is only one-half turn but this can be varied to suit operating conditions. Taking into consideration the direction of rotation F' of the half helix the column of bottles in the guide is progressively raised by cam action of the helix until the half helix has reached its initial position as shown in FIG. 1. At this moment the bottle 2b which is in the groove of the rotary shaft is freed and carried away without damage and the apparatus is ready for a new operation.

For a chosen cadence the half helix will rotate one full turn which is to say that the movement of rotation continues throughout the cycle. Supposing for example that the apparatus delivers a bottle per second at the point of discharge of the rotary shaft. The half helix could well enough make a complete turn per second and this rotation could be made at constant speed and without interruption, but it could equally be executed during a fraction of the duration of the cycle for example a half second. The half helix remaining immobile during the other half second. Thus the cycle could be split up for example as follows:

At instant $t = 0$ a bottle 2b rests on the upper part, near edge 8a, of the half helix. At that instant the half helix is put into rotation and uncovers the end of the guide; the bottle 2b takes the place of bottle 2c on the conveyor and the bottle 2a takes the place of bottle 2b. At the instant $t = \theta$ the lower part, near edge 8a, of the half helix comes into contact with the bottom of bottle 2a. During the following one-fourth of a second the half helix continues to turn raising the bottle 2a above bottle 2b and remains immobile during the remaining one-half second of the cycle.

It follows that numerous modifications of detail can be introduced into the mode of operation which has been described without departing from the scope of the invention. For example the semi-helix can be replaced by other types of operational lifters such as a jet of compressed air capable of maintaining the upper bottles elevated throughout the period of time that no groove section is open below the bottle. Furthermore in place of the microswitch it is possible to use a pneumatic valve operated by the land of the rotary shaft. Similarly the photoelectric cell can be replaced by other apparatus such as one of ultrasonic type.

It is clear from what has been said hereinabove that the apparatus is adapted to the handling of all kinds and shapes of objects.

The advantages of the invention are in the accomplishment of the objects of the invention and include as elements of particuler value high adaptability to handle different shapes, sizes and kinds of objects at different rates and cadences with precision of spacing and alignment.

As many apparently widely different embodiments of the present invention may be made without departing from the spirit and scope thereof, it is to be understood that the invention is not limited to the specific embodiments.

What is claimed is:

1. Loading and conveying apparatus comprising a horizontal conveyor, means to position objects on the conveyor comprising a rotary shaft mounted above and to one side of the conveyor and having a spiral land bounding a spiral groove, the latter being large enough and deep enough to partially embrace objects, means to load objects onto the conveyor and into the groove in sequence as successive portions of the groove reach the loading means, the latter comprising vertically arranged guide means above the conveyor and means for supporting objects in said guide means for releasing the same one by one to drop from the guide means onto the conveyor and into the section of the groove below the guide means, means to detect the presence of the groove section below the guide means, and means responsive to said detection means to effect actuation of said supporting means to release an object to drop from the guide means and to thereafter engage the succeeding object for supporting the same.

2. Apparatus according to claim 1 including means to reveal the absence of an object in release position in the guide means and means responsive thereto to prevent activation of the supporting and release means.

3. Apparatus according to claim 2 in which the means to reveal comprises a light beam traversing the path of the objects in the guide and photoelectric cell means aligned therewith.

4. Apparatus according to claim 1 in which the means to detect comprises switch means having rider means in position to engage the spiral land during a portion of each revolution of said shaft, and means activated by the switch means to operate the object supporting and release means.

5. Apparatus according to claim 1 in which the supporting and release means comprises a rotary helix of less than one turn aligned with the guide means above the conveyor at about the height of the objects being delivered to the conveyor, the gap in the rotary helix being coordinated with arrival of a groove section below the guide means.

6. Apparatus according to claim 5 in which a motor controlled by the detection means drives the rotary helix through one full turn at each activation of the switch means by the rider means.

7. Apparatus according to claim 5 in which the angular dimensions of the helix and its speed of rotation are a function of the height of the objects being deposited on the conveyor and the speed of rotation of the rotary shaft.

8. Apparatus according to claim 1 in which the apparatus is a bottle-loading machine and the guide means and associated controls are coordinated to the shape of the bottles.

* * * * *

UNITED STATES PATENT OFFICE
CERTIFICATE OF CORRECTION

PATENT NO. : 3,856,131
DATED : December 24, 1974
INVENTOR(S) : Guy Flamand and Henri Lazzarini It is certified that error appears in the above-identified patent and that said Letters Patent are hereby corrected as shown below:

Column 1, line 56, for "adn" substitute --and--.
Column 2, line 24, cancel --not-- before "provided".
Column 5, line 3, for "t = 0" substitute --t = 1/4--.

Signed and sealed this 1st day of July 1975.

(SEAL)
Attest:

RUTH C. MASON
Attesting Officer

C. MARSHALL DANN
Commissioner of Patents
and Trademarks